United States Patent
Masaki et al.

(10) Patent No.: US 7,041,360 B2
(45) Date of Patent: May 9, 2006

(54) PROTECTIVE, DIFFUSIVE FILM AND PROCESS FOR PRODUCING THE SAME

(75) Inventors: Tadahiro Masaki, Shinjuku-Ku (JP); Fumihiro Arakawa, Shinjuku-Ku (JP)

(73) Assignee: DAI Nippon Printing Co., Ltd., Tokyo (JP)

( * ) Notice: Subject to any disclaimer, the term of this patent is extended or adjusted under 35 U.S.C. 154(b) by 176 days.

(21) Appl. No.: 10/144,772

(22) Filed: May 15, 2002

(65) Prior Publication Data
US 2003/0030372 A1 Feb. 13, 2003

(30) Foreign Application Priority Data
May 17, 2001 (JP) .............................. 2001-148207

(51) Int. Cl.
*B32B 11/02* (2006.01)

(52) U.S. Cl. ...................... 428/141; 428/323; 428/332; 428/411.1

(58) Field of Classification Search ................ 369/286; 428/141, 411.1, 323, 332, 913, 411.11; 362/286
See application file for complete search history.

(56) References Cited

U.S. PATENT DOCUMENTS 6,485,824 B1 * 11/2002 Senga et al. ................. 428/323
6,731,591 B1 * 5/2004 Hayashida et al. ......... 369/286

\* cited by examiner

*Primary Examiner*—Sandra O'Shea
*Assistant Examiner*—Anabel Ton
(74) *Attorney, Agent, or Firm*—Oliff & Berridge, PLC

(57) ABSTRACT

There is provided a protective, diffusive film for use in a surface light source device provided with a lens film, said protective, diffusive film comprising: a transparent substrate layer; and a resin layer provided on at least one of the top surface and the under surface of the transparent substrate layer, the resin layer having a tensile elongation at break in the range of 20% to 200%.

9 Claims, 5 Drawing Sheets

PROTECTIVE, DIFFUSIVE FILM AND PROCESS FOR PRODUCING THE SAME

BACKGROUND OF THE INVENTION

1. Field of the Invention

The present invention relates to a protective, diffusive film and more particularly to a protective, diffusive film which can suppress the formation of burrs at the time of processing for the formation of sheet-like films, possesses excellent punchability, and is excellent in handleability in a sheet-like film form, a process for producing the same, and a surface light source device and a liquid crystal display device using said protective, diffusive film.

2. Background Art

A large number of surface light source devices provided with a protective, diffusive film have hitherto been proposed. An example of a surface light source device using a protective, diffusive film 110 is shown in FIG. 5. FIG. 5 is a cross-sectional view of a liquid crystal display device 135 provided with a surface light source device 120 which is an edge-type flat light source. The surface light source device 120 comprises, for example, a light source 121, a light guide plate 122, a reflection film 124, a light diffusive film 125, a lens film 140, and a protective, diffusive film 110.

The light guide plate 122 is surface light projection means, and has a light source 121 on its side end and, on its non-light-outgoing surface remote from a light outgoing surface 122a, a dot pattern 123 for diffusing light from the light source 121 and directing the light to a light outgoing direction. The reflection film 124 is provided on the non-light-outgoing surface side of the light guide plate 122 and functions to block off unnecessary light beams and, at the same time, to reflect and return light beams to a predetermined direction.

A lens film 140 is disposed on the light outgoing surface 122a side of the light guide plate 122 through a light diffusive film.(a diffusive plate) 125 for diffusing light to conceal the dot pattern 123 in such a manner that the lens film 140 on its prism surface 140a faces the light outgoing surface side.

In order to impart the function of diffusing light to the light diffusive film (diffusive plate) 125, the light diffusive film (diffusive plate) 125 has hitherto been formed by incorporating, in a dispersed state, organic or inorganic beads as a light diffusing agent into a transparent resin substrate, or by coating an ink containing organic or inorganic beads as a diffusing agent onto a transparent resin substrate.

A protective, diffusive film 110 is provided on the light outgoing surface side of the lens film 140, for preventing the prism 140a in the lens film 140 and a liquid crystal display element 133 from coming into direct contact and being damaged by each other, for example, due to vibration in transit. The protective, diffusive film 110 also has the function of slightly diffusing light for concealing stripes of the prism 140a in the lens film 140, a spacer (not shown), and the like. To this end, the protective, diffusive film 110 has hitherto been formed by incorporating, in a dispersed state, organic or inorganic beads as a light diffusing agent into a transparent resin substrate, or by coating an ink containing organic or inorganic beads as a diffusing agent onto a transparent resin substrate.

A transmission liquid crystal display element 133 comprising a liquid crystal layer 130 sandwiched between a lower substrate 132 and an upper substrate 131 is provided on the light outgoing side of the surface light source device 120, and the liquid crystal display element 133 is illuminated from backside by the surface light source device 120.

The conventional protective, diffusive film 110 is mounted on a surface light source device (backlight) after sheet punching. When the punchability is poor, burrs are formed on the end face of the product and adversely affect the function of the surface light source device.

SUMMARY OF THE INVENTION

The present inventor has now found that bringing the tensile elongation at break of the resin layer to a value falling within a specific range can realize the production of a high-quality protective, diffusive film which can suppress the formation of burrs at the time of processing for the formation of sheet-like films, possesses excellent punchability, and is excellent in handleability in a sheet-like film form. The present invention has been made based on such finding.

Accordingly, it is an object of the present invention to provide a protective, diffusive film which has been improved in handleability at the time of the production thereof and in quality as a product.

According to one aspect of the present invention, there is provided a protective, diffusive film for use in a surface light source device provided with a lens film, said protective, diffusive film comprising:

a transparent substrate layer; and a resin layer provided on at least one of the top surface and the under surface of the transparent substrate layer, the resin layer having a tensile elongation at break in the range of 20% to 200%.

According to another aspect of the present invention, there is provided a process for producing the protective, diffusive film according to the present invention, said process comprising the steps of:

introducing an ionizing radiation-curable resin into a cylinder having an inverted shape of concaves and convexes of the resin layer;

applying an ionizing radiation to the ionizing radiation-curable resin to cure the ionizing radiation-curable resin to form concaves and convexes.

DETAILED DESCRIPTION OF THE INVENTION

EMBODIMENTS OF THE PRESENT INVENTION

Figure 1:
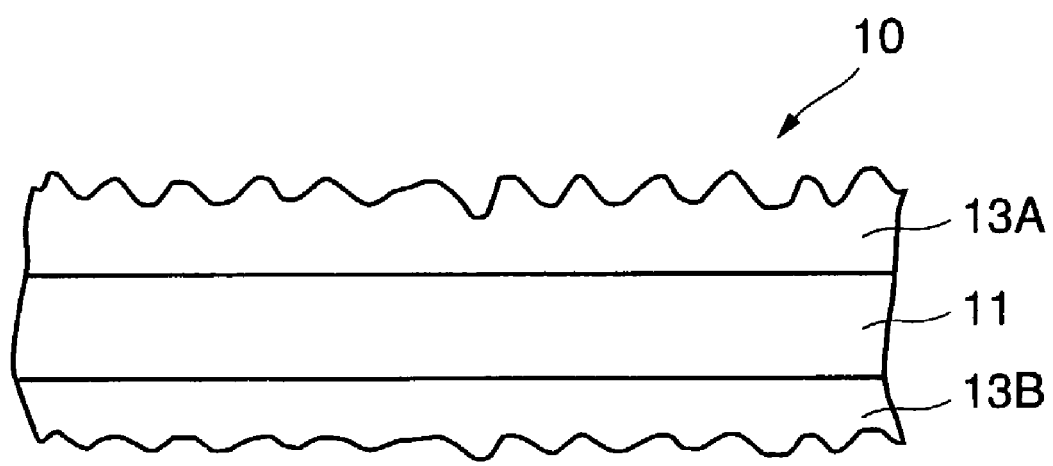
FIG. 1 is a partially enlarged cross-sectional view of a protective, diffusive film.

Embodiments of the present invention will be explained while making reference to elements with reference characters attached thereto. However, it should be noted that the present invention is not to be construed as being limited to these embodiments.

According to a first embodiment of the present invention, there is provided a protective, diffusive film (10) for use in a surface light source device (20) provided with a lens film (40), said protective, diffusive film (10) comprising:

a transparent substrate layer (11); and a resin layer (13A, 13B) which is provided on at least one surface of the transparent substrate layer and has on its surface fine concaves and convexes, wherein the resin having on its surface fine concaves and convexes has a tensile elongation at break in the range of 20% to 200%.

According to a second embodiment of the present invention, there is provided a protective, diffusive film wherein, in the protective, diffusive film (10) according to the first embodiment of the present invention, the resin layer having on its surface fine concaves and convexes (in the present invention, referred to also as a "protective, diffusive layer") has a tensile modulus in the range of 20 MPa to 1000 MPa.

According to a third embodiment of the present invention, there is provided a protective, diffusive film (10) wherein, in any one of the protective, diffusive films (10) according to the first and second embodiments of the present invention, the resin layer having on its surface fine concaves and convexes is formed of an ionizing radiation-cured resin.

According to a fourth embodiment of the present invention, there is provided a process for producing the protective, diffusive film (10) according to any one of the first to fourth embodiments of the present invention, said process comprising the steps of:

shaping the ionizing radiation-curable resin by means of a cylinder plate (88) having a mold shape conforming to the shape of said concaves and convexes (step of shaping); and applying an ionizing radiation to the ionizing radiation-curable resin to cure the ionizing radiation-curable resin (step of curing).

According to a fifth embodiment of the present invention, there is provided a surface light source device comprising:

a light source (21);

surface light projection means (22) for surface projecting light, emitted from the light source, from a light projection surface (22a) to a predetermined direction;

a lens film (40) provided on the light projection surface; and the protective, diffusive film, according to any one of the first to fourth embodiments of the present invention, provided on the light outgoing surface side of the lens film.

According to a sixth embodiment of the present invention, there is provided a liquid crystal display device (35) comprising:

a light source (21);

surface light projection means (22) for surface projecting light, emitted from the light source, from a light projection surface (22a) to a predetermined direction;

a lens film (40) provided on the light projection surface;

the protective, diffusive film (10), according to any one of the first to fourth embodiments of the present invention, provided on the light outgoing surface side of the lens film; and a transmission liquid crystal display element (33) disposed on the light outgoing surface side of the protective, diffusive film.

Protective, Diffusive Film

An embodiment of the protective, diffusive film according to the present invention is shown in FIG. 1. The protective, diffusive film in this embodiment will be described with reference to FIG. 1. A protective, diffusive film 10 comprises a substrate film 11 and resin layers (protective, diffusive layers 13A, 13B) provided respectively on both sides of the substrate film 11.

In the present invention, the resin layer has a tensile elongation at break in the range of 20% to 200%. In the case of a tensile elongation at break of not less than 20%, at the time of punching, when a punching blade tears off the film, the resin is stretched to a suitable extent. This prevents cracking at the end portion (inner part of 30 to 50 μm from the end) of the product and can effectively prevent the formation of yarn waste-like burrs. When the tensile elongation at break is not more than 200%, the resin is not torn and, thus, the formation of whisker-like burrs can be prevented.

According to a preferred embodiment of the present invention, the tensile modulus of the resin layer is preferably in the range of 20 MPa to 1000 MPa. When the tensile modulus is not less than 20 MPa, the surface of the resin has a suitable level of hardness. Therefore, the handleability of films in a sheet form, which have been tacked together, is good. More specifically, when one sheet-like film located on the uppermost position is taken off from the stacked sheet-like films, there is no fear of two or more sheet-like films in a stacked state being taken off. When the tensile modulus is not more than 1000 MPa, the surface of the resin has a suitable level of hardness and cracking at the product end portion of the protective, diffusive layer can be effectively prevented.

a) Transparent Substrate Layer

The transparent substrate layer (substrate film 11) is specifically formed of a stretched or unstretched film of a thermoplastic resin, such as cellulose triacetate, polyester, polyamide, polyimide, polypropylene, polymethyl pentene, polyvinyl chloride, polyvinyl acetal, polymethyl methacrylate, polycarbonate, or polyurethane. The thickness of the transparent substrate layer is preferably 50 to 200 μm from the viewpoint of handleability, such as processability, although the thickness also varies depending upon the rigidity of the film. The transparent substrate layer on its top surface and under surface, where the resin layers (protective, diffusive layers 13A, 13B) are provided, is preferably subjected to easy-adhesion treatment, such as corona discharge treatment, from the viewpoint of highly stabilizing the adhesion to the resin layers to be stacked.

b) Resin Layer

In the present invention, the resin layers (protective, diffusive layers 13A, 13B) have, on the surface thereof, fine concaves and convexes and protect members which come into contact with the protective, diffusive film, and have concealment effect by virtue of a suitable level of light diffusion properties.

In the present invention, the resin layer is provided on at least one of the top surface and the under surface of the transparent substrate layer. According to another embodiment of the present invention, the resin layer may be provided on both surfaces of the transparent substrate layer. In this case, the resin layers may be formed of an identical material, that is, a material comprising identical components.

The resin layers (protective, diffusive layers 13A, 13B) each preferably have a surface roughness index Rz (ten-point mean roughness) in the range of 1 to 6 μm. When the surface roughness index Rz is in this range, the concealment properties and the optical characteristics are good. For example, the Rz value of the protective, diffusive layers 13A, 13B (embodiment of the present invention) shown in FIG. 1 is 1.6 μm.

A haze defined as the ratio of the luminance of an object to the luminance of the object as viewed through a scattering medium is used as a measure of the level of light diffusion. The haze of the protective, diffusive film 10 is preferably in the range of 15 to 50, more preferably in the range of 20 to 40. When the haze is in this range, the concealment properties of the protective, diffusive film and the luminance are good. For example, the haze of the protective, diffusive film 10 shown in FIG. 1 (embodiment of the present invention) is 30.

Figure 2:
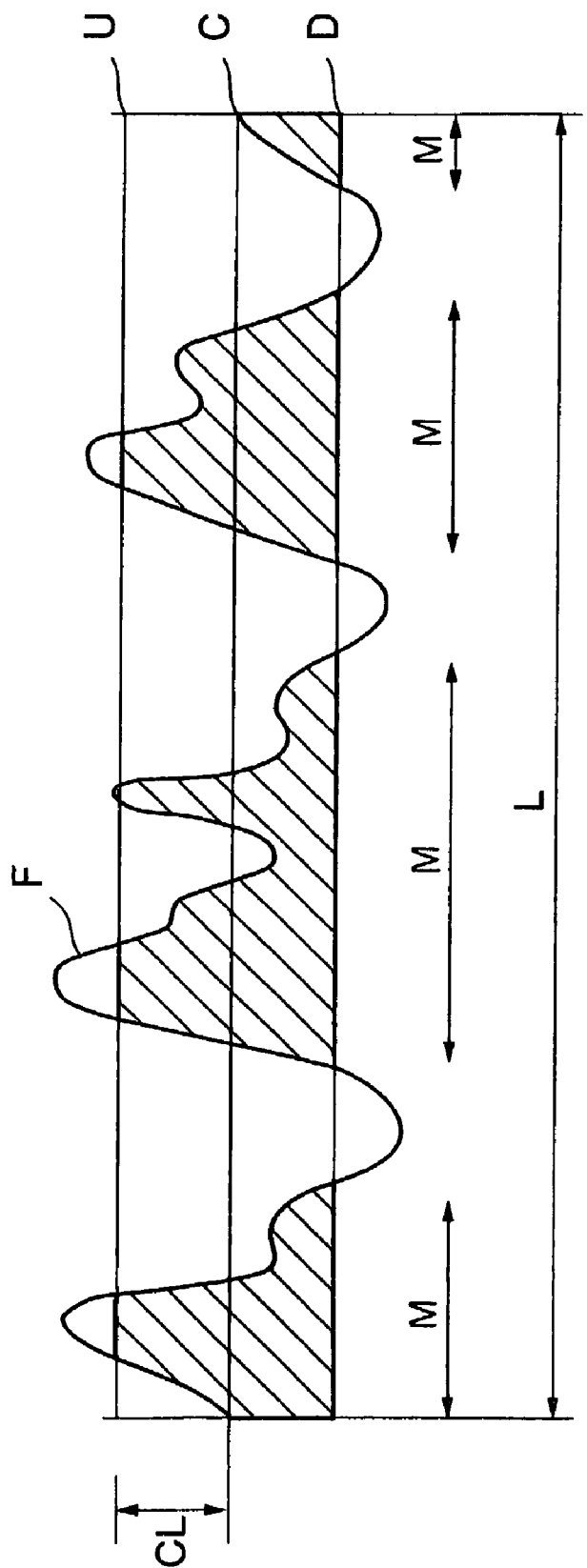
FIG. 2 is a diagram illustrating a Pc1 method.

The count of Pc (profile peaks) in the resin layers (protective, diffusive layers 13A, 13B) is preferably in the range of 2 to 15. When the count of Pc is in this range, the concealment properties and the optical characteristics are good. The count of Pc (profile peaks) may be measured by a Pc1 method. The Pc1 method will be described with reference to FIG. 2. In the Pc1 method, a count level CL is set, and two lines parallel to a center line C of a roughness curve F, an upper peak count level U and a lower peak count level D, are provided. In a portion between two points where the lower peak count level D crosses the roughness curve F, when one or more points, where the upper peak count level U crosses the roughness curve F, exist, this is counted as one profile peak. This count is carried out for a reference length L, and the surface roughness is expressed in terms of the count of the profile peaks. In the embodiment shown in FIG. 2, since there are four profile peaks, the count of Pc (profile peaks) as measured by the Pc1 method is 4. In the case of the protective, diffusive layers 13A, 13B (embodiment of the present invention) shown in FIG. 1, the count of Pc (profile peaks) as measured under conditions specified in Table 1 below is 8.

TABLE 1

| Measurement conditions (Pc1 method) | |
| --- | --- |
| Longitudinal magnification: | 2000 times |
| Lateral magnification: | 50 times |
| Reference length: | 0.8 mm |
| Phase characteristics: | Normal |
| Feed rate: | 0.1 mm/sec |
| Count level: | ±0.1 μm |

The resin layers (protective, diffusive layers 13A, 13B) are formed from a composition containing an oligomer or a prepolymer of, for example, a (meth)acrylate (here "(meth)acrylate" referring to both acrylate and methacrylate) of a polyfunctional compound, such as a polyhydric alcohol, and a relatively large amount of a reactive diluent. Specific examples of the diluent include: monofunctional monomers, for example, ethyl (meth)acrylate, ethylhexyl (meth)acrylate, styrene, vinyltoluene, and N-vinylpyrrolidone; and polyfunctional monomers, for example, trimethylolpropane tri(meth)acrylate, hexanediol (meth)acrylate, tripropylene glycol di(meth)acrylate, diethylene glycol di(meth) acrylate, pentaerythritol tri(meth)acrylate, dipentaerythritol hexa(meth)acrylate, 1,6-hexanediol di(meth)acrylate, and neopentyl glycol di(meth)acrylate. According to a preferred embodiment of the present invention, an ionizing radiation-curable resin may be mentioned as the resin for use in the formation of the resin layer, and the above-described monomers or oligomers and the like may be mentioned as compositions for use in the formation of the resin layers.

When the ionizing radiation-curable resin is an ultraviolet-curable resin, a photopolymerization initiator may be used. Specific examples of photopolymerization initiators include acetophenones, benzophenones, Michler's benzoyl benzoate, α-amyloxime esters, and thioxanthones. Photosensitizers usable herein include n-butylamine, triethylamine, and tri-n-butylphosphine.

The ionizing radiation-curable resin may contain a reactive organosilicon compound represented by formula

wherein R and R' each represent an alkyl group having 1 to 10 carbon atoms;

m+n=4; and m and n are each an integer.

Specific examples of organosilicon compounds include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Alternatively, the resin layers (protective, diffusive layers 13A, 13B) may be formed of a thermoplastic resin. Examples of thermoplastic resins usable herein include: acrylic resins, such as methyl methacrylate and ethyl methacrylate; polyesters, such as polyethylene terephthalate, polybutylene terephthalate, and polyethylene naphthalate; polyhydrocarbons, such as polycarbonate, polystyrene, polypropylene, and polymethyl pentene; polyamides, such as 6,6-nylon and 6-nylon; saponification products of ethylene-vinyl acetate copolymers; polyimides; polysulfones; polyvinyl chlorides; and acetylcellulose.

Production Process of Protective, Diffusive Film

Figure 3:
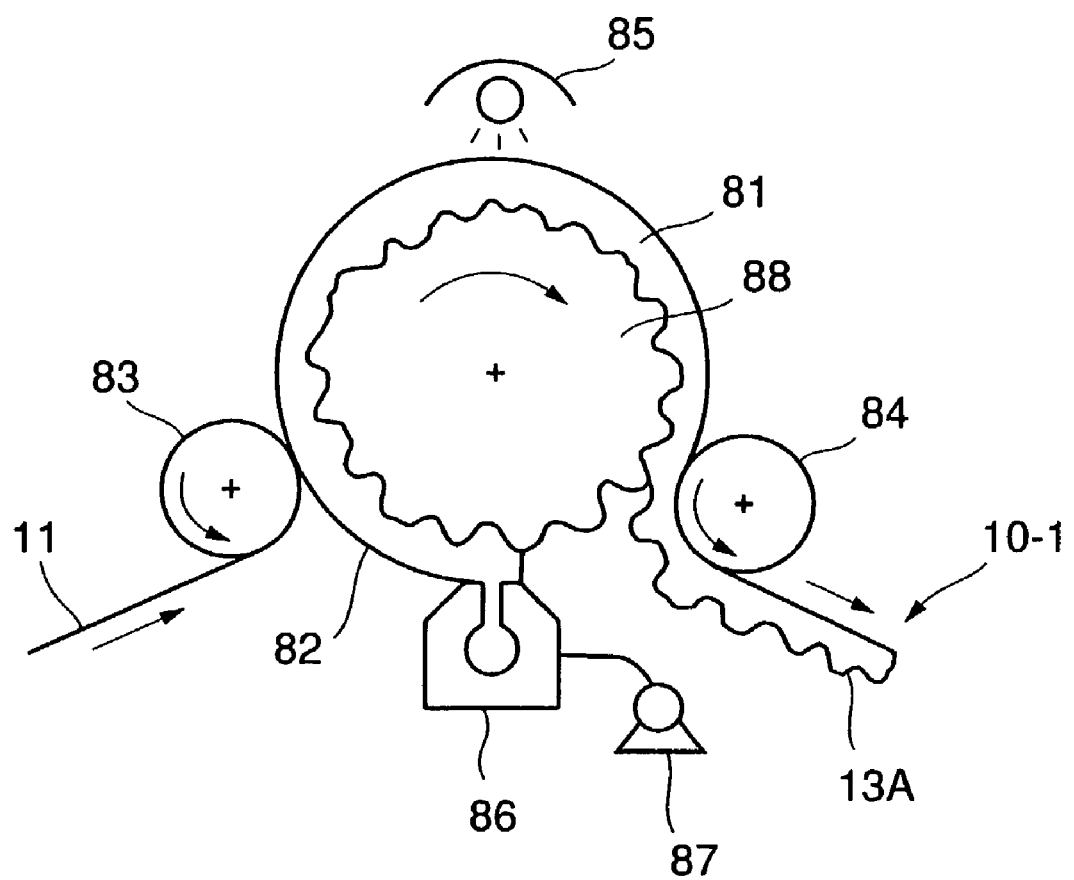
FIG. 3 is a schematic diagram illustrating a process for forming a protective, diffusive layer 13A.

A process for producing a protective, diffusive film will be described with reference to FIG. 3. A substrate film 11 is fed through an inlet nip 83 to a cylinder plate 88 having an inverted shape of concaves and convexes provided on the surface of the resin layer to be formed. An ionizing radiation-curable resin 82 is fed through a pump 87 to a die head 86 and is evenly introduced into the cylinder plate 88. After the substrate film 11 is brought into intimate contact with the cylinder plate 88 by means of an inlet nip 83 (step of shaping), an ionizing radiation is applied to the assembly by an ionizing radiation exposure system 85 (a D-bulb ultraviolet lamp, manufactured by Fusion) to form an ionizing radiation-cured resin 81 which is adhered to the substrate film 11 (step of curing). Thereafter, at an outlet nip 84, the protective, diffusive layer 13A formed on the substrate film 11 is separated from the cylinder plate 88 to form a film 10-1 which is a form in the course of the formation of a protective, diffusive film 10. A protective, diffusive layer 13B is further formed by the same step as described above on the film 10-1 to produce the protective, diffusive film 10 shown in FIG. 1.

According to another embodiment of the present invention, the upper resin layer (protective, diffusive layer 13A) and the lower resin layer (protective, diffusive layer 13B) can be produced respectively using cylinder plates which are identical to or different from each other in the shape of concaves and convexes.

The production process of the present invention is a roll-to-roll continuous shaping process by DPS and thus can produce a larger amount of and more inexpensive protective, diffusive films as compared with the conventional production process.

Surface Light Source Device and Liquid Crystal Display Device

Figure 4:
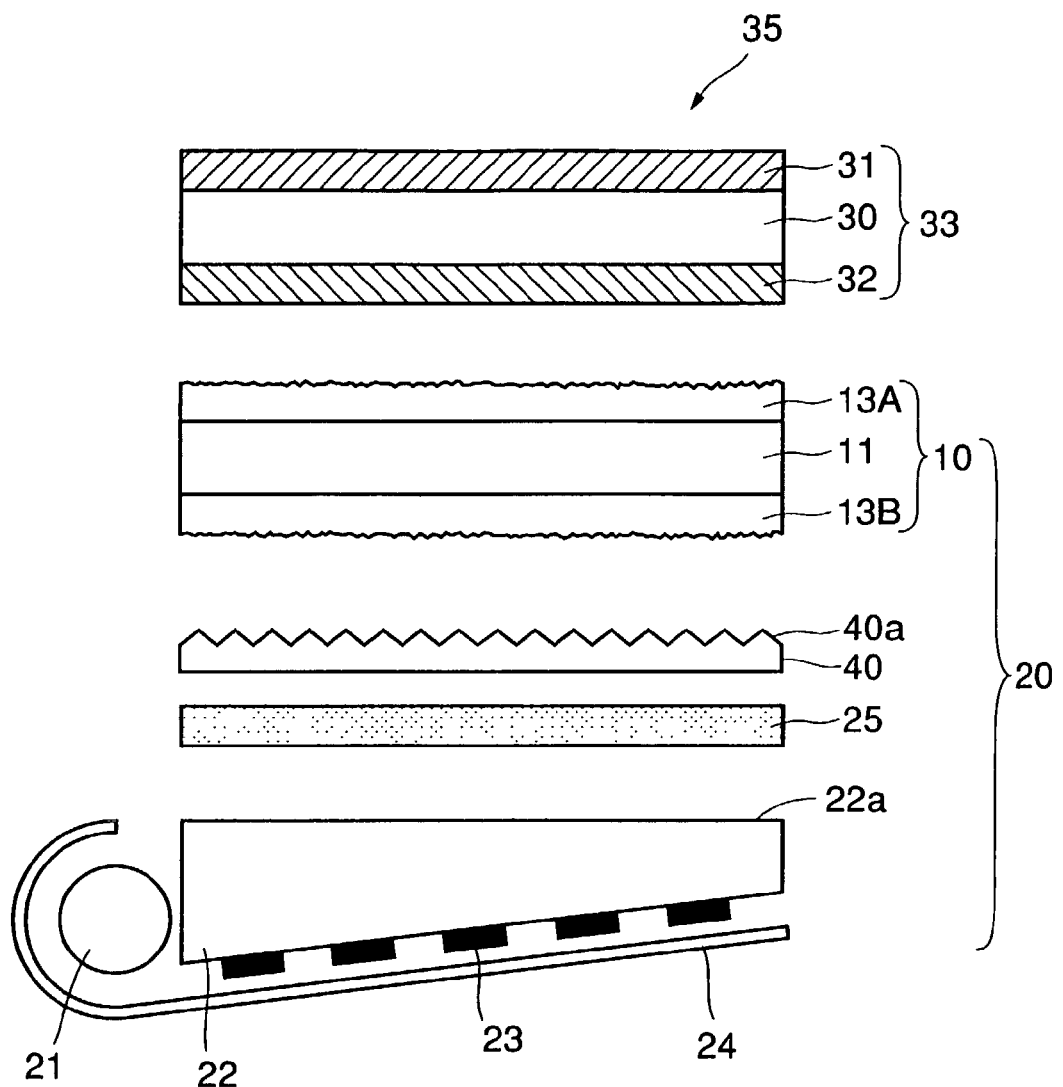
FIG. 4 is a cross-sectional view of a liquid crystal display device 35 provided with a surface light source device 20 using a protective, diffusive film 10.
Figure 5:
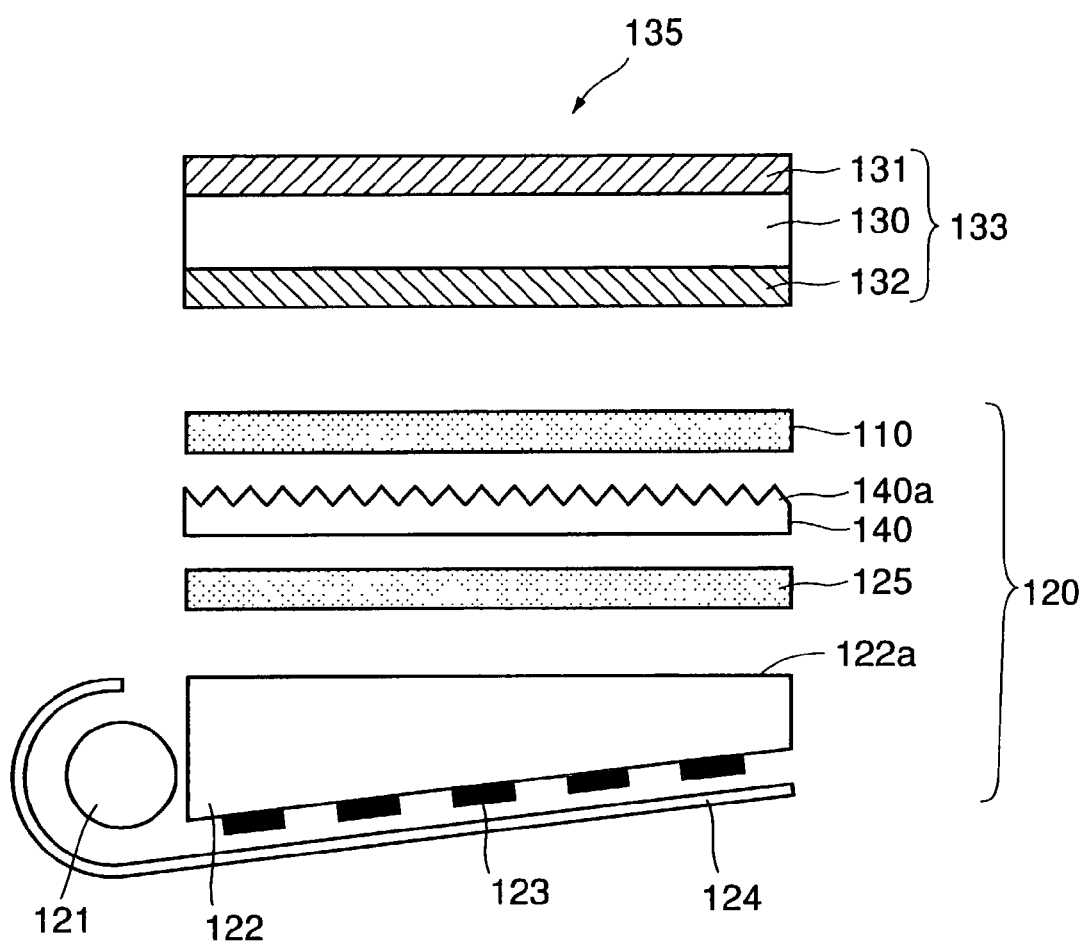
FIG. 5 is a cross-sectional view of a liquid crystal display device 135 provided with a surface light source device 120 using a conventional protective, diffusive film 110.

In the surface light source device and the liquid crystal display device according to the present invention, the protective, diffusive film according to the present invention is used. By virtue of this, handleability at the time of assembling is good, rejects do not occur, and the reliability of products can be enhanced. As shown in FIG. 4, the protective, diffusive film 10 according to the present invention may be used to produce a liquid crystal display device 35 provided with a surface light source device 20. The surface light source device 20 comprises, for example, a light source 21, a light guide plate 22, a reflection film 24, a light diffusive film 25, a lens film 40, and a protective, diffusive film 10. A protective, diffusive film 10 is provided on the lens film 40 in its light outgoing surface side from the viewpoint of preventing the prism 40a in the lens film 40 and a liquid crystal display element 33 from coming into direct contact and being damaged by each other, for example, due to vibration in transit. The liquid crystal display device 35 provided with the surface light source device 20 can be produced from the protective, diffusive film 10 and other elements described above as elements constituting the liquid crystal display device 135.

EXAMPLES

The following examples further illustrate the contents of the present invention, but should not be construed as limiting the present invention.

Example 1

Protective, Diffusive Film

A protective, diffusive film 10 was produced using the following substrate by the above-described production process.

Transparent substrate film 11: PET film (A 4300 (thickness 188 μm), manufactured by Toyobo Co., Ltd.)

Resin layers (protective, diffusive layers 13A, 13B): Ultraviolet-curable resin (EX-FL-02, manufactured by Dainichiseika Color & Chemicals Manufacturing Co., Ltd.)

Cylinder plate: Liquid sand (#250) was blown against the surface of a cylindrical iron material to perform sandblasting, whereby concaves and convexes corresponding to the shape of concaves and convexes provided on the surface of the resin layer were formed. Further, electrolytic polishing was carried out for finishing, followed by chromium plating for protection purposes to prepare a cylinder plate.

Surface Light Source Device

A surface light source device was produced using the protective, diffusive film 10 and the following light diffusive film and lens film.

Light diffusive film: Light diffusive film D 121, manufactured by TSUJIDEN Co., Ltd.

Lens film: BEF 2, manufactured by Sumitomo 3M Ltd.

Comparative Example 1

A protective, diffusive film was produced in the same manner as in Example 1, except that RC 19-941 (manufactured by Dainippon Ink and Chemicals, Inc.) was used instead of the ultraviolet-curable resin.

Comparative Example 2

A protective, diffusive film was produced in the same manner as in Example 1, except that RC 20-294 (manufactured by Dainippon Ink and Chemicals, Inc.) was used instead of the ultraviolet-curable resin.

Evaluation Test

The protective, diffusive films thus prepared were subjected to evaluations 1 to 3, and the results are shown in Table 2 below.

Evaluation 1: Resin Tensile Test (i) Shape of Specimen (No. 1 Type Specimen)

Total length: 80 mm

Width: 10 mm

Length of specimen between grips: 40 mm

Thickness: 80 to 100 μm (ii) Preparation of Specimen

Each of the resins used in the above examples was coated by an applicator onto an untreated PET film (100 μm), which had not been subjected to easy-adhesion treatment, to a resin thickness of 80 to 100 μm. An ionizing radiation was applied by an ionizing radiation exposure system 85 (a D-bulb ultraviolet lamp F 600, manufactured by Fusion) onto the surface of the resin coating to cure the coating. The ionizing radiation was applied under conditions of line speed 10 m/min, set illuminance 45%—double continuous irradiation. After the curing, the resin layer was cut from the top of the PET film (100 μm) into the shape (i) to prepare a specimen.

(iii) Measuring Method

The specimen was tested for resin tensile properties according to JIS K 7127 (Testing Method for Tensile Properties of Plastic Films and Sheets) under conditions of speed 10 mm/min, temperature 23° C., and humidity 55% RH.

Evaluation 2: Sheet-Like Film Punching Test

Each of the protective, diffusive films prepared in the above example and comparative examples was punched up with a Thomson blade having a size of 100×150 mm into sheet-like films, and the top and under surfaces of the end face of the products were observed under a magnifying glass (magnification: 30 times) to measure the number of formed burrs. The results were expressed in terms of average value for three specimens.

Evaluation 3: Sheet-Like Film Handling Test

Each of the protective, diffusive films prepared in the example and comparative examples was cut into 20 sheet-like films of size A4. The 20 sheet-like films were put on top of one another, and one sheet-like film located on the uppermost position was taken off from the stacked sheet-like films to examine the handleability. The handleability was evaluated according to the following criteria.

.: In taking off the one sheet-like film, two or more sheet-like films were not taken off in a stacked state at a time.

x: In taking off the one sheet-like film, two or more sheet-like films were taken off in a stacked state at a time.

TABLE 2

|  | Resin | Evaluation 1 | | Evaluation 2 | Evaluation 3 |
| --- | --- | --- | --- | --- | --- |
|  |  | Elongation at break | Modulus |  |  |
| Ex. 1 | EX-FL-02 | 85% | 466 MPa | 0/film | ○ |
| Comp. Ex. 1 | RC 19-941 | 15% | 215 MPa | 15/film | ○ |
| Comp. | RC 20-294 | 11% | 18 MPa | 10/film | X |

TABLE 2-continued

| | Evaluation 1 | | | |
|---|---|---|---|---|
| Resin | Elongation at break | Modulus | Evaluation 2 | Evaluation 3 |
| Ex. 2 | | | | |

What is claimed is:

1. A protective, diffusive film for use in a surface light source device provided with a lens film, said protective, diffusive film comprising:
   a transparent substrate layer; and
   a resin layer provided on at least one of the top surface and the under surface of the transparent substrate layer,
   the resin layer having a tensile elongation at break in the range of 20% to 200%.

2. The protective, diffusive film according to claim 1, wherein the resin layer has a tensile modulus in the range of 20 MPa to 1000 MPa.

3. The protective, diffusive film according to claim 1, wherein the resin layer is formed of an ionizing radiation-cured resin.

4. The protective, diffusive film according to claim 1, wherein the resin layer has a surface roughness index Rz (ten-point mean roughness) in the range of 1 to 6 μm.

5. The protective, diffusive film according to claim 1, which has a haze in the range of 15 to 50.

6. The protective, diffusive film according to claim 1, wherein the count of Pc (profile peaks) in each of the resin layers is in the range of 2 to 15 as measured by a Pc1 method.

7. A process for producing a protective, diffusive film according to claim 1, said process comprising the steps of:
   introducing an ionizing radiation-curable resin into a cylinder having an inverted shape of concaves and convexes of the resin layer;
   applying an ionizing radiation to the ionizing radiation-curable resin to cure the ionizing radiation-curable resin to form concaves and convexes.

8. A surface light source device comprising:
   a light source;
   surface light projection means for surface projecting light, emitted from the light source, from a light projection surface to a predetermined direction;
   a lens film provided on the light projection surface side of the surface light projection means; and
   the protective, diffusive film, according to claim 1, provided on the light outgoing surface side of the lens film.

9. A liquid crystal display device comprising: the surface light source device according to claim 8; and a transmission liquid crystal display element,
   said liquid crystal display element being disposed on the light outgoing surface side of the protective, diffusive film.

* * * * *